L. PETERSON.
LUNCH BOX HEATER.
APPLICATION FILED APR. 4, 1917.

1,266,853.

Patented May 21, 1918.

Inventor
LUTHER PETERSON
By Watson E. Coleman
Attorney

UNITED STATES PATENT OFFICE.

LUTHER PETERSON, OF PAYETTE, IDAHO.

LUNCH-BOX HEATER.

1,266,853.　　　　Specification of Letters Patent.　　Patented May 21, 1918.

Application filed April 4, 1917. Serial No. 159,751.

*To all whom it may concern:*

Be it known that I, LUTHER PETERSON, a citizen of the United States, residing at Payette, in the county of Canyon and State of Idaho, have invented certain new and useful Improvements in Lunch-Box Heaters, of which the following is a specification, reference being had to the accompanying drawings.

This invention relates to heating appliances, and particularly to means for heating lunch boxes and the contents thereof.

The general object of the invention is to provide in combination with a lunch box, a heater which is preferably detachable from the lunch box, but which, when attached thereto, will keep the contents of the lunch box hot for a relatively long time.

A further object is to provide a construction of this kind adapted to the use of charcoal or like heating material.

A further object is to provide means for locking the tray supporting the heating element, whatever it may be, in place and this locking appliance also acting to lock the heater or heating chamber to the lunch box.

A further object is to provide a construction of this character, which is very simple in construction, may be cheaply made, and which permits the lunch box to be used separately from the heater, when so desired.

Other objects will appear in the course of the following description.

My invention is illustrated in the accompanying drawings, wherein:—

Figure 1:
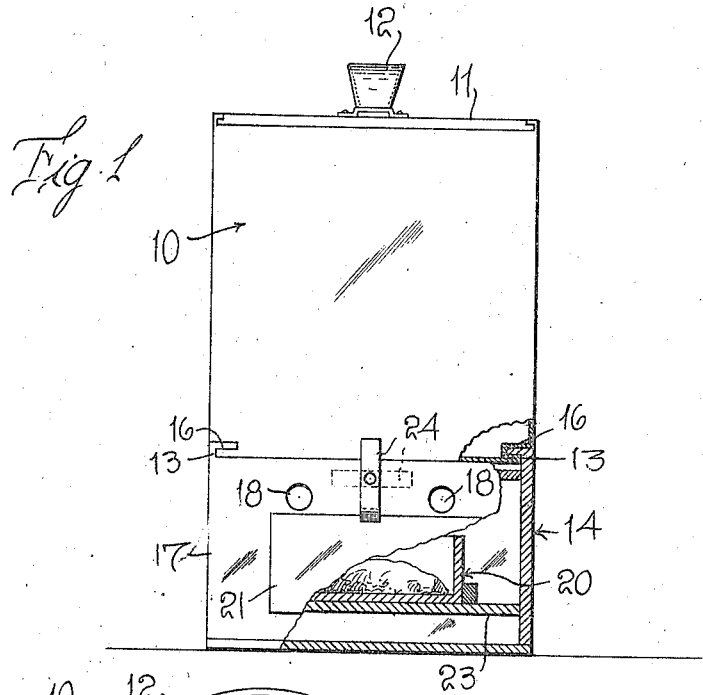
Figure 1 is an end view of my combined heater and lunch box, the heater being partly broken away.

Referring to these drawings, 10 designates a lunch box of any suitable or ordinary form, which is made of metal, and which is illustrated as provided with a sliding cover 11 and a handle 12, whereby it may be carried. The bottom of the lunch box is provided with the laterally disposed guideways 16, which may be formed in any suitable manner and which are designed to detachably engage with the heater casing, designated 14.

This heater casing is illustrated as rectangular in form and is provided with a top 15, which is below the upper edges of the side and end walls. The side and end walls, at their upper edges, are formed with inwardly projecting, laterally disposed flanges 13, adapted to engage in the guideways 16. These guideways 16 open upon the front of the lunch box 10. While I have illustrated the guideways as being on the lunch box, it is to be understood that these guideways might be formed upon the heater casing and the flanges on the lunch box.

The front wall of the heater casing is formed with perforations 18 and an opening 19 and adapted to be inserted in this opening is a sliding tray 20, designed to contain heating material, such as charcoal, though I wish it understood that any other desired heating element might be substituted for the charcoal. As illustrated, this heating tray 20 is provided at its end with the plate 21, which projects beyond the sides of the tray so as to close the opening 19 and the side walls of the tray are provided with perforations 22, whereby air may have access to the charcoal or other heating element contained on the tray, this air entering the casing through the perforations 18. Preferably, a false bottom 23 is provided within the casing upon which the tray 20 rests, though any other suitable means may be provided for guiding the tray in place. It is obvious that the bottom of the tray may be formed with perforations, if desired.

Figure 2:
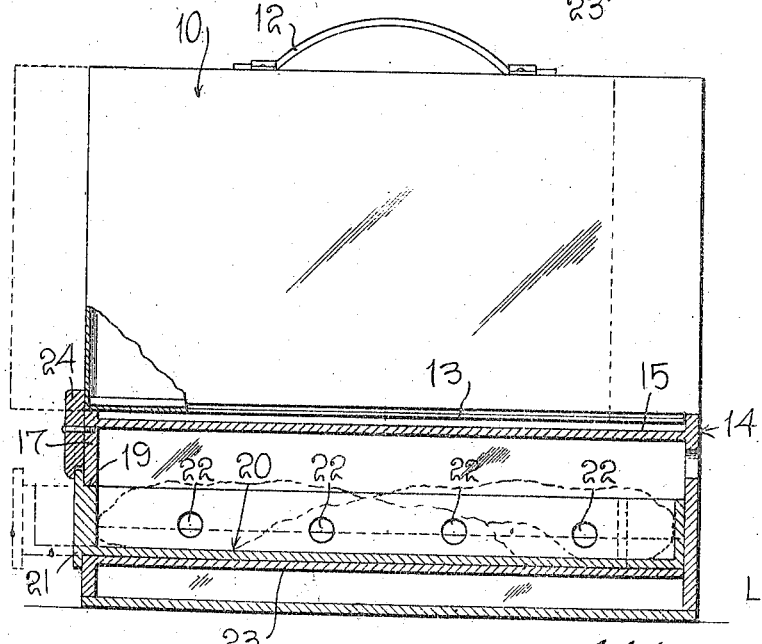
Fig. 2 is a side elevation of the lunch box, the heater being shown in section.

For the purpose of holding the tray 20 in place and also locking the casing 14 to the lunch box, I provide a button 24, which button is pivotally mounted upon the front wall 17 of the casing and is so formed that when the button is turned to a vertical position, as illustrated in Fig. 1, it will overlap the plate 21 and also overlap the front wall of the lunch box. Under these circumstances, the tray cannot be removed without turning the button, nor can the heater be disconnected from the lunch box. This is for the reason that the lunch box, in order to disconnect it from the heater, must be shifted toward the dotted line position in Fig. 2 and this is prevented by the button 24. It is obvious, however, that the button may be rotated so as to permit this disconnection and permit the removal of the tray.

I do not wish to be limited to the particular material of the lunch box and heater casing, nor the particular construction of the means whereby the heater casing and the lunch box are slidingly connected to each other. It will be obvious that my device is very convenient, particularly for laborers and others who carry lunch to their work and who naturally desire a warm meal at lunch time. I have found in practice that my construction will keep the contents of the lunch box warm for several hours and at very little cost. It is, of course, obvious that when a warm lunch is not desired, it is only necessary to disconnect the heater casing from the lunch box.

Having described my invention, what I claim is:—

1. The combination with a lunch box, a heater casing detachably connected thereto, a tray slidably engaged with the heater casing and adapted to contain a heating element, and single means for locking the tray in place and locking the heater casing in engagement with the lunch box.

2. The combination with a lunch box and a heater casing having sliding engagement with one wall of the lunch box, of a tray slidably engaged with the heater casing and having an end member disposed on the exterior of the heater casing, and a button mounted on the end of the heater casing and rotatable into engagement with the lunch box and the projecting end of the tray to lock them both in place.

3. A lunch box and a heater casing, one provided with laterally projecting flanges and the other with flange receiving grooves whereby the lunch box and heater casing may be slidably engaged with each other, a tray slidable into the heater casing and adapted to support a heating element, and single means for locking the lunch box from disengagement from the heater casing and locking the tray in position within the heater casing.

4. A lunch box and a heater casing, one provided with laterally projecting flanges and the other with flange receiving grooves whereby the lunch box and heater casing may be slidably and detachably engaged with each other, means limiting the relative sliding movement of the casing and lunch box in one direction, a tray slidable into the heater casing and adapted to support a heating element, and a button pivotally mounted upon the front wall of the heater casing and when turned in one position engaging over the tray and over the front wall of the lunch box to thereby prevent sliding movement of the lunch box relative to the heater casing to thereby prevent detachment of the lunch box from the heater casing.

In testimony whereof I hereunto affix my signature in the presence of two witnesses.

LUTHER PETERSON.

Witnesses:
F. H. LYON,
DOROTHY E. PETERSON.

Copies of this patent may be obtained for five cents each, by addressing the "Commissioner of Patents, Washington, D. C."